United States Patent [19]
Sampsell

[11] Patent Number: 5,563,398
[45] Date of Patent: Oct. 8, 1996

[54] SPATIAL LIGHT MODULATOR SCANNING SYSTEM

[75] Inventor: Jeffrey B. Sampsell, Plano, Tex.

[73] Assignee: Texas Instruments Incorporated, Dallas, Tex.

[21] Appl. No.: 786,162

[22] Filed: Oct. 31, 1991

[51] Int. Cl.[6] ............................................. G06K 7/10
[52] U.S. Cl. .............................. 235/454; 235/462; 235/472
[58] Field of Search ............................................ 359/291, 294

[56] References Cited

U.S. PATENT DOCUMENTS

| | | | |
|---|---|---|---|
| 4,596,992 | 6/1986 | Hornbeck | 359/291 |
| 4,615,595 | 10/1986 | Hornbeck | 359/291 |
| 4,698,602 | 10/1987 | Armitage | 359/294 |
| 4,701,047 | 10/1987 | Eibert et al. | 356/1 |
| 5,021,641 | 6/1991 | Swartz et al. | 235/467 |

FOREIGN PATENT DOCUMENTS

| | | |
|---|---|---|
| 62035323 | 8/1985 | Japan . |
| 63049892 | 8/1986 | Japan . |
| 2124142 | 11/1988 | Japan . |
| 1604375 | 12/1981 | United Kingdom . |
| 2239101 | 11/1989 | United Kingdom . |

*Primary Examiner*—David C. Nelms
*Assistant Examiner*—Trong Phan
*Attorney, Agent, or Firm*—Julie L. Reed; James C. Kesterson; Richard L. Donaldson

[57] ABSTRACT

A system for scanning objects is disclosed. The system consists of a light source, a spatial light modulator, and appropriate optics for directing the light from the source to the spatial light modulator and to the object to be scanned. Individual elements upon the modulator are activated to reflect those pixels' width of the light to the object. A detector is mounted such as to receive reflections from the object to be processed. The system can be hand-held, mounted into a counter, or used in other applications such as edge detector scanners.

5 Claims, 4 Drawing Sheets

SPATIAL LIGHT MODULATOR SCANNING SYSTEM

BACKGROUND OF THE INVENTION

1. Field of the Invention

This invention relates to systems that scan images, more particularly to such systems that use spatial light modulators.

2. Background of the Invention

Systems that scan images can be found in many places. Supermarkets use them to scan bar codes on product labels. These are normally mounted underneath the counter top, and the system scans the bar code from below. Department stores typically have a hand held unit that allows the clerk to scan the tags of products being purchased. When inventory records are due, the clerk can walk out onto the floor and record items hanging on the racks. Scanning is also used in many other applications such as edge scanners for automated material movement.

Conventional scanners normally utilize a mirror that is used in conjunction with a light source. In supermarket scanners, for example, the light source is some type of laser. The mirror is a rotating polygonal solid which scans a dot of light along a linear axis. There is a detector, normally mounted near the scanning optical system that records the light bouncing back into the unit. When the bar code has a white area, there is a low level of light returned, since white paper is a light diffuser. But when the light dot hits a black bar, the light level drops. This drop off signals the unit to do some simple processing. It counts the increment of time for which there is no return light. A thick black bar may be six or seven increments, a thin one only one or two. After the bar code is scanned in this manner, the cash register then compares the read bar code with its database of products, selects the product and its price.

Occasionally, this systems take quite of bit of time to read a bar code. The system is still scanning at the same rate, but because of the motion of the mirror, occasionally there is a mis-read. The cash register cannot find the related product, and the code must be read again. More importantly, mechanical drivers such as the one to spin the mirror are expensive and consume a relatively large amount of power. Additionally, the units must be somewhat bulky to allow for the mirror to have enough room to spin, and the coil or motor that give the impetus for the mirror to move. Finally, these mechanical parts wear out and start giving consistently bad readings as the mirror does not spin correctly, or they just stop functioning completely.

It would be desirable to eliminate the moving mechanical parts, to increase each units lifetime. This would also serve to make the units lighter and more accurate, eliminating the need for re-scans.

SUMMARY OF THE INVENTION

Objects and advantages will be obvious, and will in part appear hereinafter and will be accomplished by the present invention which provides an image scanner using a light source, a linear spatial light modulator (SLM), and appropriate optics. The image is scanned by activating one pixel at a time along the line of SLM cells to replace the function of the moving mirror in conventional scanners.

It is an object of this invention to provide a scanner that is lighter and more reliable, without any moving mechanical parts.

BRIEF DESCRIPTION OF THE DRAWINGS

For a complete understanding of the invention, and the advantages thereof, reference is now made to the following description in conjunction with the accompanying drawings, in which.

DETAILED DESCRIPTION OF THE PREFERRED EMBODIMENTS

Figure 1:
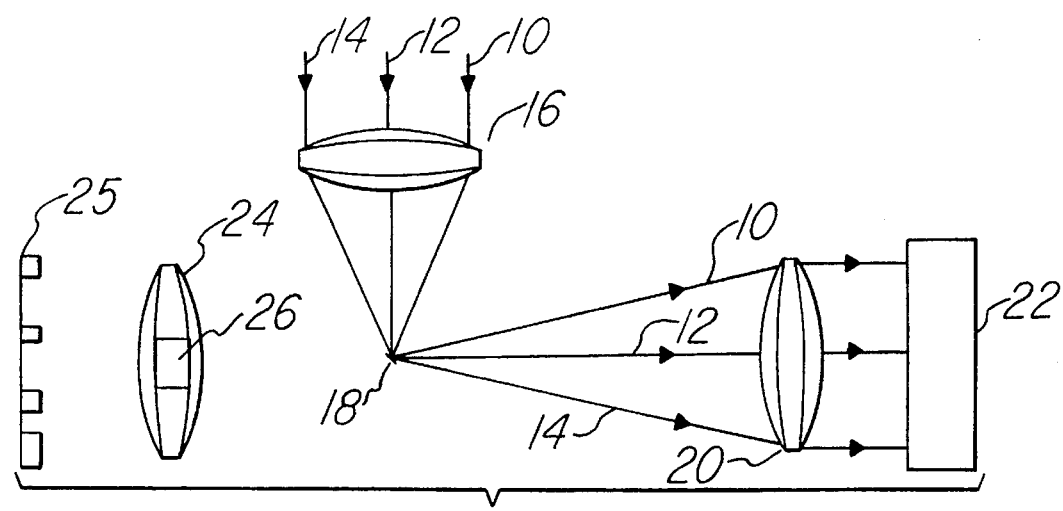
FIG. 1 shows a scanning system including a spatial light modulator in its inactive state for a Schlieren optical system.

FIG. 1 shows a top view of a scanning system that does not use a moving mirror, in its inactive state. Rays 10, 12 and 14, respectively, will illuminate the right side, the middle and the left side of the modulator. The light from the source is passed through lens 16, which focuses the three rays onto the stationary, tilted, stop mirror 18. Stop mirror 18 reflects and separates the rays to pass them through lens element 20. Lens element 20 is arranged to achieve the opposite effect of element 16, as it collimates the rays and passes them to the spatial light modulator array 22. In this instance, none of the pixels of the array are activated. The only requirement for the spatial light modulator in its inactive state is that it reflects the rays back along the same path they arrived through. In this state, the stop mirror works to prevent any of the illumination from reaching the lens element 24, which has detector 26 mounted above it. The detector does not necessarily need to be mounted there. Its only requirement is that it must be able to detect reflections from the object being scanned 25.

It must be made clear at this point that every pixel along the SLM would be activated. An array of pixels may be 1000 pixels long. The use of the three example pixels is to show three areas of interest on the device. It is not meant to be implied that only three such pixels are used.

Figure 2A:
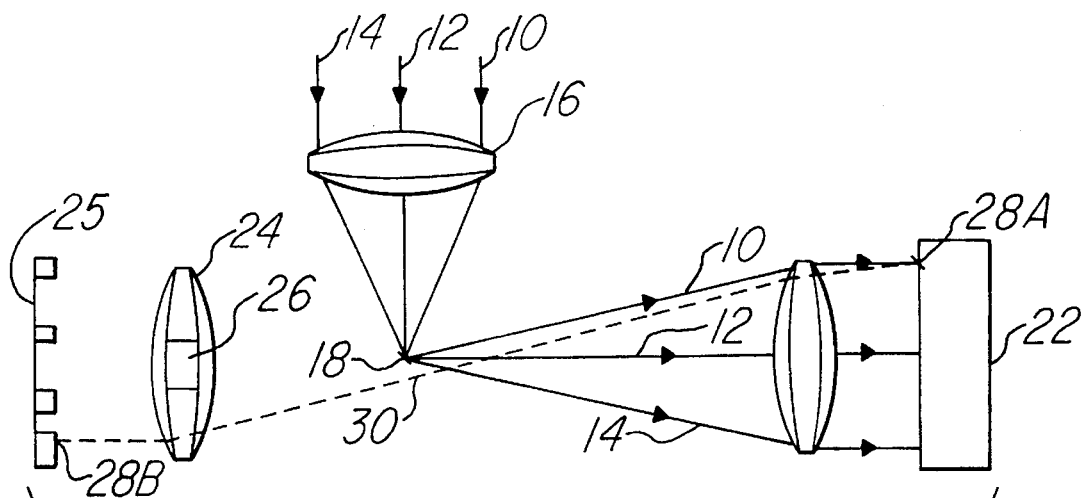
FIGS. 2A–2C shows the light rays as individual pixels are activated at the start, middle and end of the device for a Schlieren optical system.

FIG. 2A shows how the object 25, such as a bar code, is scanned. The requirement for the spatial light modulator now changes. To scan the image in this part of the system, the spatial light modulator must be able to reflect the outgoing beam to a different path from the incoming path. Additionally, the SLM must be able to do this one pixel at a time.

An ideal SLM for this is the deformable mirror device (DMD). The DMD consists of an array of micromechanical mirrors suspended on hinges over an air gap. At the bottom of the air gap, underneath the mirrors, is an array of electrodes for addressing the mirrors. When the electrode has charge placed upon it, the mirror over that electrode deflects to an angle that will allow it to direct light back along a different path.

The light rays 10, 12, and 14 travel the same paths previously discussed. But, this time when the rays pass through the lens to the SLM, pixel 28A, where ray 10 is to impinge upon the array, is deflected at an angle. The pixels where rays 12 and 14 impinge and all other pixels, not shown, are not deflected. The deflected beam 30 now carries the light that was previously in beam 10. Because of its new path, beam 30 misses the stop mirror 18 and travels through to lens element 24. The light then impinges upon a bar code, or object, for the supermarket or department store scanner, which then reflects diffuse light back to the detector, since the spot 28B is on a white bar. Only the light reflected by point 28B, corresponding to pixel 28A, will be seen by the detector 26. White is represented by a raised area on the object 25, and black by the holes between the raised areas.

Figure 2B:
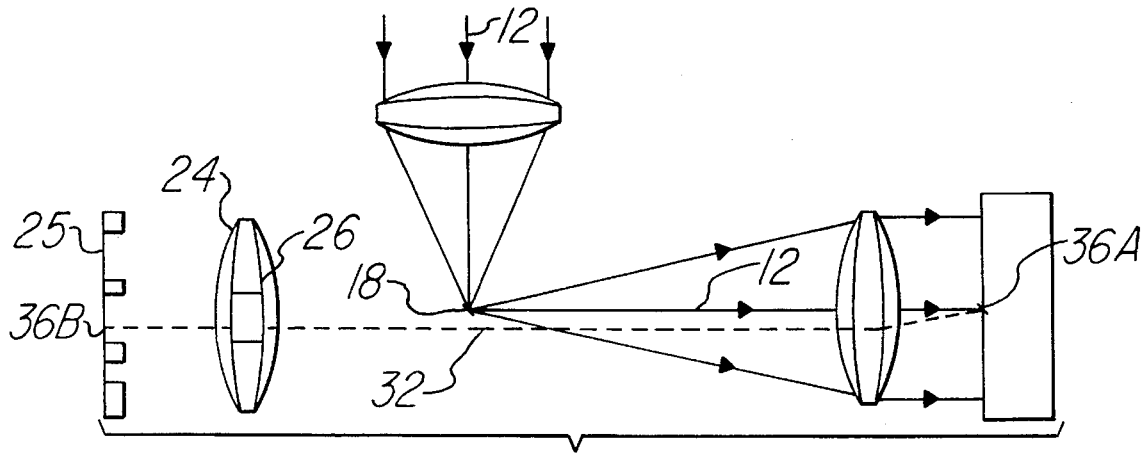
Figure 2C:
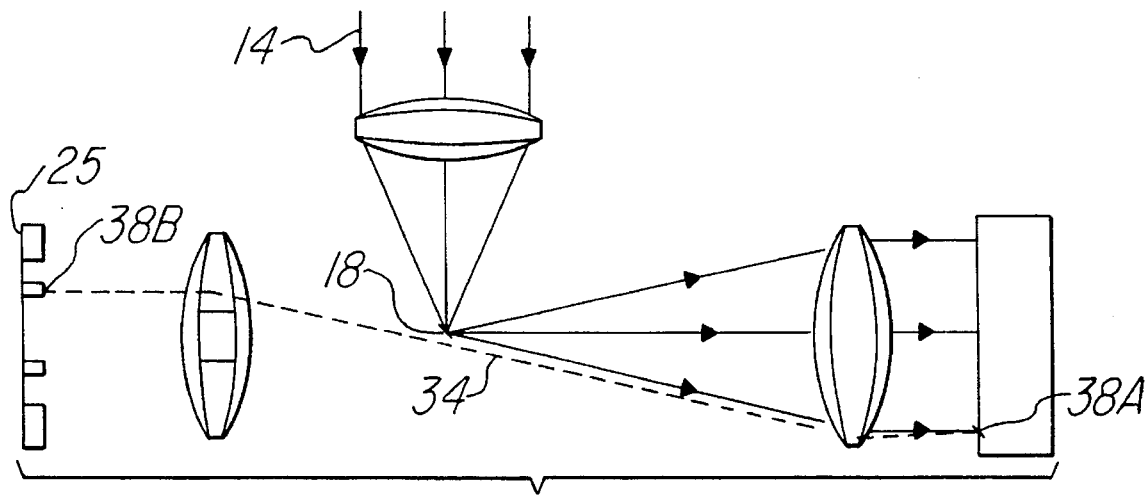

In FIG. 2B, the same thing is repeated for the middle of the image, in beam 12. This time pixel 36A is deflected, while all other pixels are flat, and deflected beam 32 is directed away from the stop mirror 18. Ray 32 then passes through the lens 24 and reflects a lower level of light, since point 36B is on a black spot, to detector 26. FIG. 2C shows the same process for the left edge of the image in beam 14. Beam 14 impinges upon deflected pixel 38A and is reflected into beam 34. Beam 34 then passes through the lens 24 and impinges upon the bar code or object at point 38B.

Figure 3A:
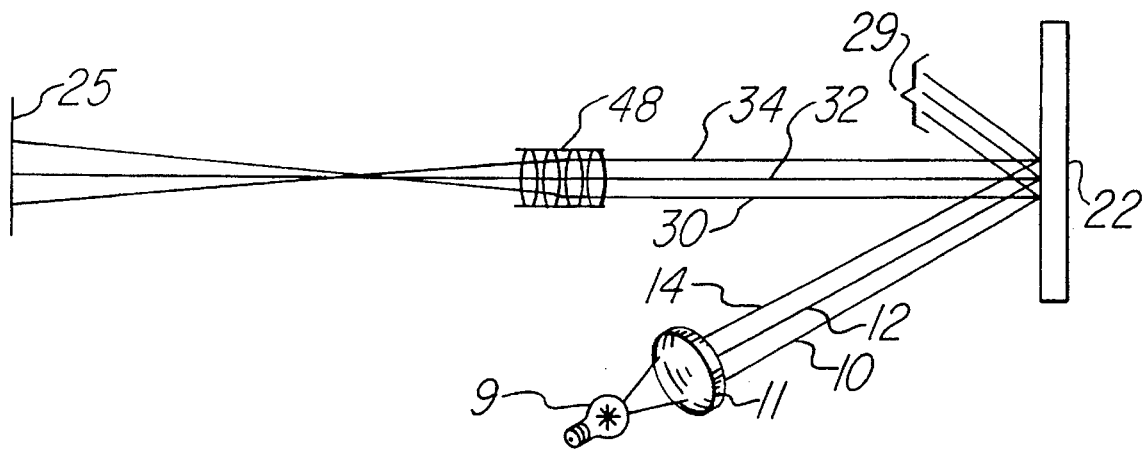
FIG. 3A shows a scanning system including a spatial light modulator and dark field optics.

FIG. 3A shows a further embodiment of the scanning system, using dark field optics. In this embodiment, light source 9 directs light through lens 11, via beams 10, 12, and 14, to the spatial light modulator 22. If any of the pixels 28A, 36A, or 38A are deflected, the light would travel along paths 30, 32 or 34, respectively. Light from the undeflected pixels would travel along the group of paths 29 as unused light. Reflected light passes through the dark field optics system 48 and impinges upon object 25. The detector, not shown, could be placed anywhere in the proximity of object 25 to receive light levels reflected from the object as long as the detector can receive reflections from said object.

The use of Schlieren optics or dark field optics is up to the designer, as are the selection of any other types of optics. Schlieren optics require an inherent trade-off between signal strength and dynamic range, while dark field optics, if appropriate can provide both large signal and wide dynamic range. Additionally, any selected optics may require a long optical axis. This problem can be avoided as shown in FIG. 3B.

Figure 3B:
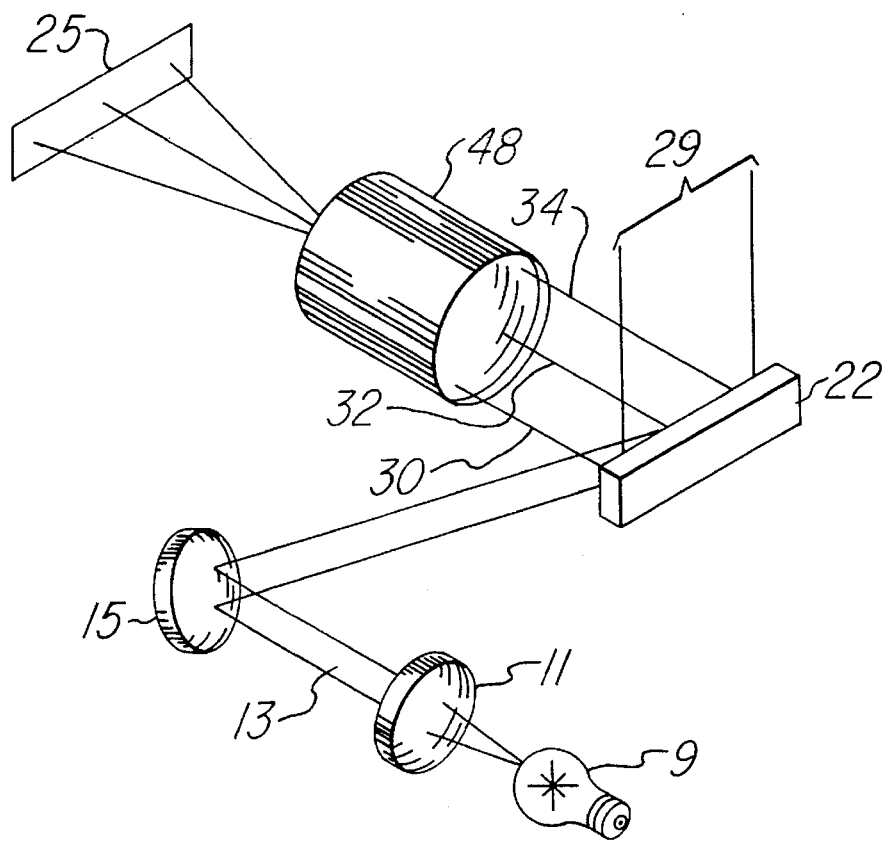
FIG. 3B shows a dark field optics scanning system folded to fit in a hand held scanning unit.

In FIG. 3B, the optical path of the previous dark field optics, shown in FIG. 3A is folded. This is particularly useful in the hand held unit, where the size is a restriction upon the design. Light source 9 provides illumination through lens 11. The path of this illumination is folded by fold mirror 15, which then passes the light to the SLM 22. Again reflected light passes in the direction shown by paths 30, 32, and 34. Unused light travels along path 29. Light reflected from the SLM passes through the optics 48 and impinges upon object 25. In a hand-held unit, the fold mirror could be located just behind the trigger guard, the light source would then be in the bottom of the hand grip, the SLM at one end of the barrel and the light would exit at the other end. Not shown is the switch which activates the light source and the SLM, most likely, a pressure switch in the hand held unit. In a counter top mounted unit, the light source is always on, but the system only registers scans when there is an object presented to it.

Figure 4:
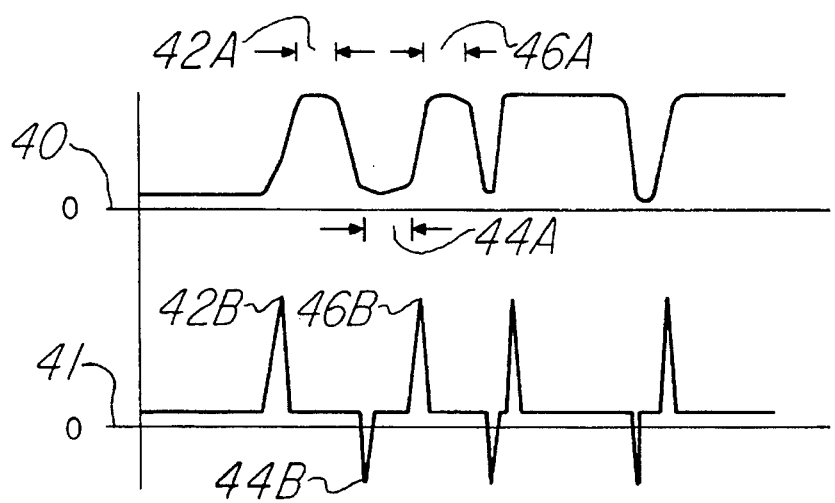
FIG. 4 shows representations of the data received by the detector and the processed result.

FIG. 4 shows the information being detected and how that information is translated into a bar code. Line 40 contains the information at the detector. The light beams being deflected along a line of the image impinge upon the bar code. When the bar code has a white spot, the detector "sees" the segment 42A. In the segment 44A, the bar code has a black bar, which reflects a lower level of light back to the detector. Similarly, during segment 46A there is a white bar. The resulting information after processing is seen on line 41. Spike 42B signals that it is the beginning of a white bar. Spike 44B shows the beginning of a black bar. The processor then counts the number of pixels between the falling edge of spike 44B and the leading edge of spike 46B to record the width of the black bar. This process continues until the entire length of the bar code has been scanned. This data is then converted to some product number and the price is sent to the cash register.

In order for this to work, the scanners must be either extremely fast, or the images presented slowly. This is often the cause of misreads at the supermarket. The clerk runs the product over the scanner too quickly, and this results in an incomplete scan. DMDs have an advantage in that they are very small. Staggering rows of the mirror as seen in FIG. 4 can increase the speed to match the fastest detector.

Figure 5:
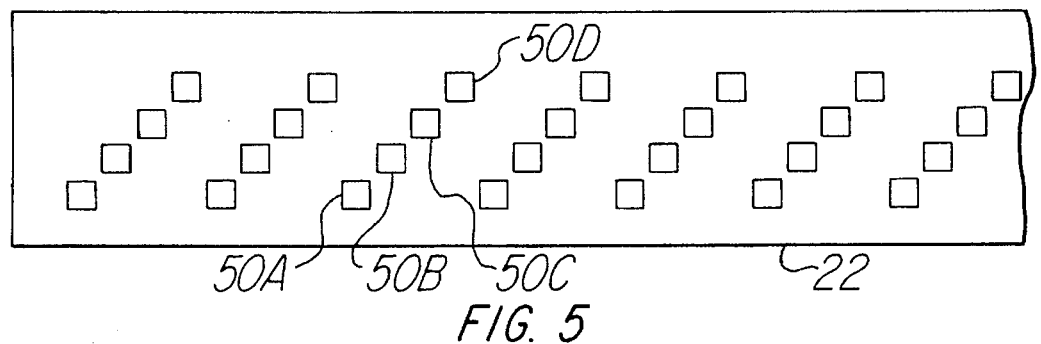
FIG. 5 shows a staggered arrangement of pixels on a spatial light modulator.
Figure 6A:
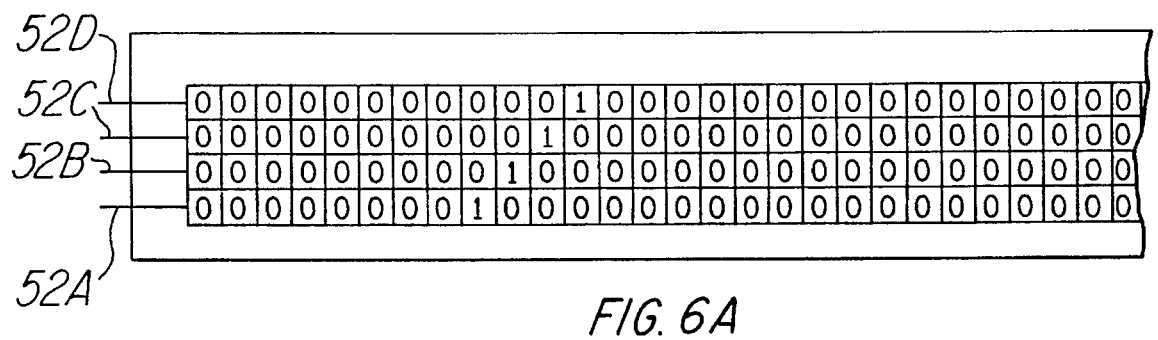
FIG. 6A shows a possible data flow through addressing shift registers.

In FIG. 5, a staggered arrangement of pixels is shown on spatial light modulator 22. Pixels 50A–50D are of particular interest, when viewed in light of FIG. 6. FIG. 6 shows a possible implementation of addressing circuitry for a deformable mirror device (DMD). In reality, addressing circuitry shown in FIG. 6A would be underneath the mirrors shown in FIG. 5.

In order to deflect pixels 50A–50D, all must have ones positioned underneath the respective mirrors. One method to do this is to shift all zeros and a one into a shift register. The adjacent shift register would then have all zeros and a one, but the one would be offset by one register from the previous. This can be seen in registers that would be directly under pixels 50A–50D The data is clocked by clocks 52A–52D. The typical switching time, that is the time it takes for new data to register, of a DMD mirror is 10 μsecs. This may be too slow to allow for quick scanning. The staggered arrangement in conjunction with a different clocking scheme can allow the processing time of a pixels to be 2.5 μsecs.

Figure 6B:
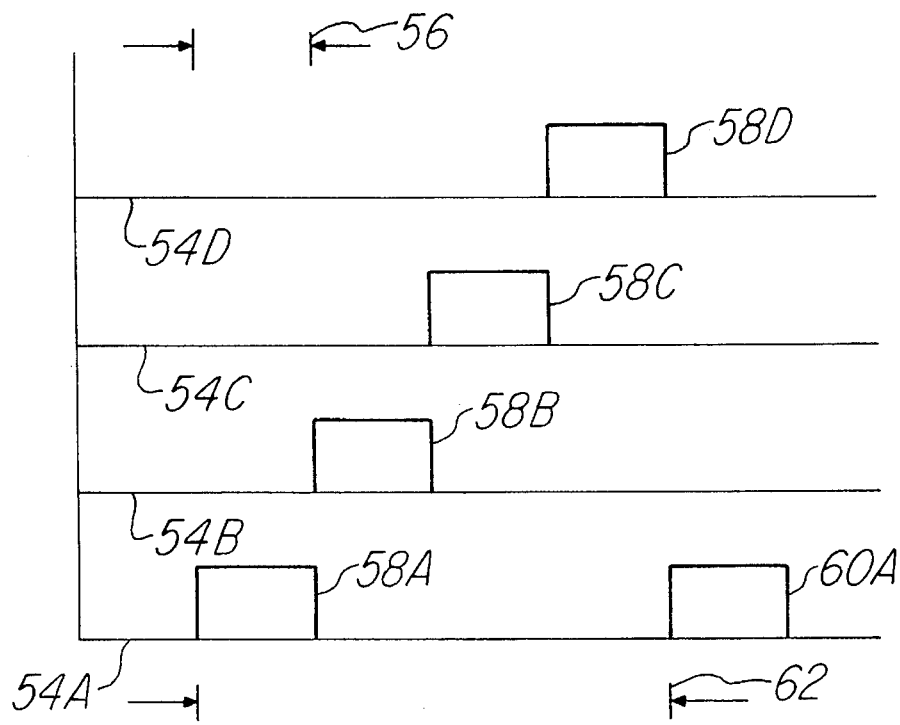
FIG. 6B shows a timing diagram for a data flow through addressing shift registers.

The timing of clocks 52A–52D is shown in FIG. 6B. Line 54A shows the timing for clock line 52A, seen in FIG. 6A for mirror 50A of FIG. 5. The data is clocked in to the cell of the address register that is directly below pixel 50A during segment 56, which is 2.5 μsecs long. While that mirror is in its switching time of 10 μsecs, the next pixel, 50B, is clocked with data by clock line 52B from FIG. 6A, seen on line 54B, pulse 58B. This continues until all four pixels have been clocked with data. After pixel 50D has received pulse 58D seen on line 54D, pixel 50A can again received data. It is clocked with pulse 60A. The time difference between the leading edge of pulse 58A and pulse 60A is shown by segment 62. It is 10 μsecs long. In summary, in the time it took to switch the first pixel, four pixels worth of light were sent along the path to the object to be scanned. This scheme could be used for any number of pixels, depending upon how fast the scanner needs to be.

This method of scanning makes it faster than conventional scanning. Regardless of what timing scheme is used, this scanner is lighter, smaller, and uses less power, due to the elimination of the spinning mirror, and the motor or coil used to drive it.

Thus, although there has been described to this point a particular embodiment for a scanning system, it is not intended that such specific references be considered as limitations upon the scope of this invention except in-so-far as set forth in the following claims.

What is claimed is:

1. A scanning system comprising:
   a. a light source;
   b. a spatial light modulator for directing light from said source to an object;
   c. a detector for receiving reflections of said light from said object, and converting said reflections into data for use in a processor; and
   d. optics for directing light from said source to said spatial light modulator and from said spatial light modulator to said object.

2. The system as claimed in claim 1 wherein said scanning system is hand-held.

3. The system as claimed in claim 1 wherein said scanning system scans from below said object.

4. The system as claimed in claim 1 wherein said spatial light modulator is a deformable mirror device.

5. A method for scanning an object comprising:
   a. providing illumination from a light source;
   b. passing said illumination to a spatial light modulator;
   c. deflecting at least one element upon said spatial light modulator to reflect part of said illumination to an object;
   d. impinging said illumination upon said object;
   e. detecting reflections of said illumination from said object; and
   f. converting said detected reflections into data for use in a processor.

* * * * *